United States Patent [19]

Takagi

[11] Patent Number: 5,160,179
[45] Date of Patent: Nov. 3, 1992

[54] PIPE COUPLER WITH SPLIT RING CHUCK
[75] Inventor: Fumio Takagi, Aichi, Japan
[73] Assignee: CKD Corporation, Komaki, Japan
[21] Appl. No.: 730,883
[22] PCT Filed: Nov. 19, 1990
[86] PCT No.: PCT/JP90/01508
    § 371 Date: Jul. 19, 1991
    § 102(e) Date: Jul. 19, 1991
[87] PCT Pub. No.: WO91/07618
    PCT Pub. Date: May 30, 1991

[30] Foreign Application Priority Data

Nov. 20, 1989 [JP] Japan .............. 1-134741[U]
Oct. 2, 1990 [JP] Japan .............. 2-104378[U]

[51] Int. Cl.$^5$ .................................. F16L 37/00
[52] U.S. Cl. ......................... 285/340; 285/313; 285/317; 285/39
[58] Field of Search ........ 258/340, 313, 317, 39, 258/321, 374

[56] References Cited

U.S. PATENT DOCUMENTS

| | | | |
|---|---|---|---|
| 3,874,709 | 4/1975 | MacDonald | 285/340 X |
| 4,146,254 | 3/1979 | Turner et al. | 285/340 X |
| 4,440,424 | 4/1984 | Mode | 285/340 X |
| 4,593,943 | 6/1968 | Hama et al. | 285/308 |
| 4,722,558 | 2/1988 | Badoureaux | 285/340 X |
| 4,747,626 | 5/1988 | Hama et al. | 285/340 X |
| 5,029,908 | 7/1991 | Belisaire | 285/340 X |

FOREIGN PATENT DOCUMENTS 61-4796 10/1983 Japan .
63-29156 9/1985 Japan .
59-63287 4/1986 Japan .
61-43595 9/1986 Japan .

Primary Examiner—Randolph A. Reese
Assistant Examiner—Timothy Aberle
Attorney, Agent, or Firm—Oblon, Spivak, McClelland, Maier & Neustadt

[57] ABSTRACT

A pipe coupler is designed such that a sealing ring (5), an annular chuck (6) and a release ring (4) are inserted into a mounting recess (2) of a coupler main body (1). Annular reaction surfaces (601, 602) are provided at the tip side of the annular chuck (6), and an action surface (301) for contrating the diameter is provided at the internal periphery of the mounting recess (2). Claws (603) are formed at the tip of the annular chuck (6), and a slit (604) is provided in the annular chuck (6) for permitting enlargement and contraction of the chuck's diameter. When a flexible tube (7) is inserted into the mounting recess (2), the diameter of the annular chuck (6) is enlarged. In this condition, when a compressed fluid is supplied, the claws (603) bite the flexible tube (7). As the release ring (4) is pressed into the mounting recess (2), the engagement of the claws (603) with the flexible tube (7) is released.

9 Claims, 12 Drawing Sheets

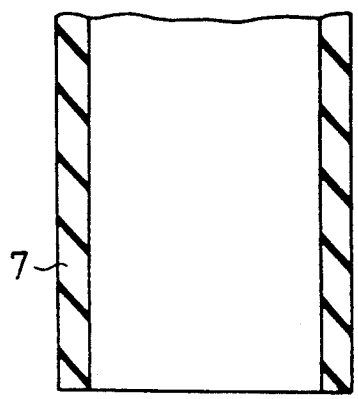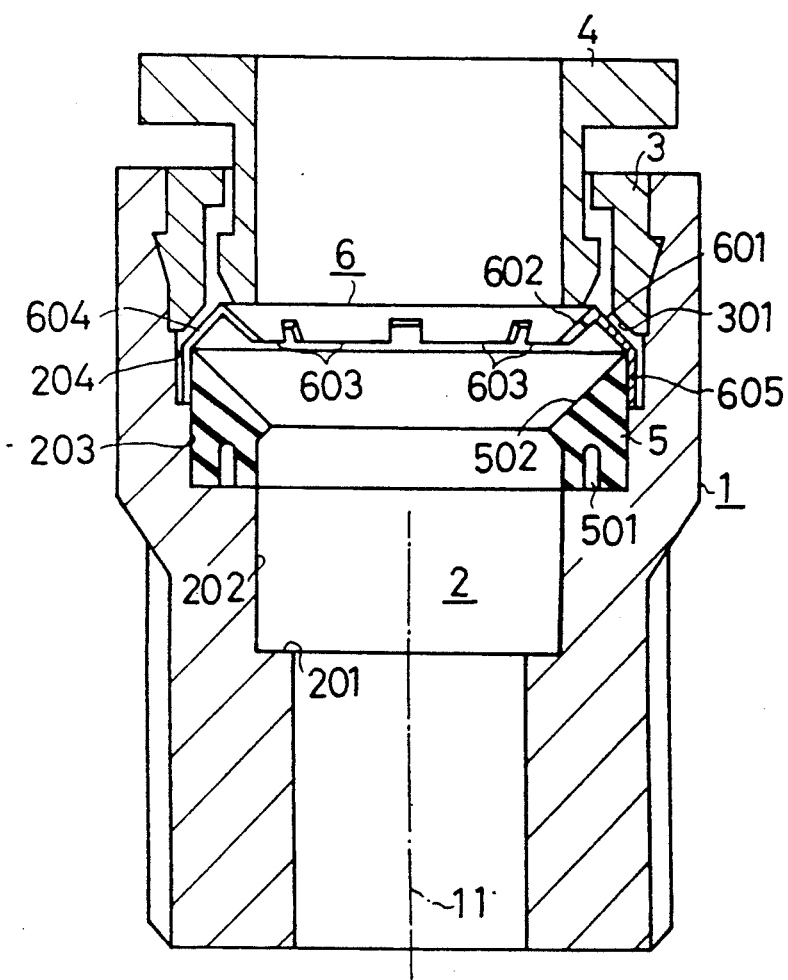

PIPE COUPLER WITH SPLIT RING CHUCK

TECHNICAL FIELD

The present invention relates to a pipe coupler for coupling a flexible tube to the connection port of a cylinder, a valve or the like in order to supply a compressed fluid.

BACKGROUND ART

As to pipe couplers of this kind, there are ones of a lock claw type such as disclosed in Japanese Utility Model Examined Publication No. 57-20947, Japanese Patent Examined Publication No. 63-29156 and Japanese Utility Model Examined Publication No. 1-7914. There are also collet type couplers as disclosed in Japanese Utility Model Examined Publication No. 57-45512, Japanese Patent Examined Publication No. 58-9311, Japanese Utility Model Examined Publication No. 61-10077 and Japanese Patent Examined Publication No. 61-10712.

A coupler of the lock claw type has an annular chuck, which has relatively good rigidity and spring-like elasticity. The annular chuck is accommodated in a mounting recess of a coupler main body. The coupler has a plurality of lock claws at the tip of the chuck. The claws engage an outer peripheral surface of a flexible tube.

The coupler of the collet type has a collet made of an elastic material. The collet has an enlarged portion at an outer periphery of the tip. The enlarged portion comes into contact with a taper of a holding ring arranged in a mounting recess of a coupler main body. This contact causes a plurality of arm segments to bend toward the axis of the collet and claws provided at an inner periphery of the arm segments engage an outer peripheral surface of a flexible tube.

However, in the lock claw type, the flexible tube is held only by the lock claws, so that the holding force totally depends upon the clamping force of the lock claws. Accordingly, in order to hold the flexible tube firmly by means of the lock claws, the clamping force must be set large. However, it is difficult to set this clamping force at the optimal level, and an excessive force is likely to be applied. If the clamping force is set too high, the lock claws will immediately and strongly clamp the flexible tube when the flexible tube is inserted into the chuck and the lock claws are opened. Therefore, although the tip of the flexible tube does not reach the innermost end of the mounting recess, an operator may think that the tip of the flexible tube does reach the innermost end. When the flexible tube is imperfectly inserted into the pipe coupler, a sealing ring located at an inner portion of the chuck incompletely seals the flexible tube, causing leakage of the fluid. Moreover, if the tip of the flexible tube does not come into contact with the innermost end of the mounting recess, the flexible tube is supported only by the lock claws with their clamping force. In this condition, when the flexible tube is swung, it swings about the lock claws. This swinging operation causes the lock claws to clamp the flexible tube even more. This may result in the formation of cracks on the flexible tube or in the flexible tube breaking off.

The clamping of the lock claws to the flexible tube is released by pressing a release ring into the mounting recess. However, when the clamping force applied to the flexible tube is large, it is not easy to release the lock claws from engagement with the tube. The clamping force of the lock claws becomes larger as the diameter of the flexible tube increases. It thus becomes more difficult to disengage the lock claws from tubes having large diameters.

It is much easier to insert and detach the flexible tube in collet type couplers than in the lock claw type. However, when the flexible tube has a small diameter, there is a problem that the flexible tube is liable to be accidentally removed. More specifically, pipe couplers for small diameter flexible tubing have a collet with an enlarged diameter tip. However, in such couplers the area of the taper on the enlarged portion of the outer periphery of the collet tip becomes small. This causes the degree of closing of the arm segments brought about by the contact between the taper of the holding ring and the enlarged portion to be insufficient. Accordingly, the clamping force of the claws to the flexible tube becomes weak.

An object of the present invention is to provide a pipe coupler capable of firmly holding a flexible tube without causing any damage to the flexible tube.

SUMMARY OF THE INVENTION

To achieve the foregoing and other objects and in accordance with the purpose of the present invention, a pipe coupler is provided for connecting a flexible tube to a fluid line connection port. The pipe coupler has a distal side defined as generally facing the flexible tube and a proximal side facing in the opposite direction. The pipe coupler includes a main body having a mounting recess for receiving the flexible tube. The mounting recess opens at a distal side of the main body. A substantially annular chuck is disposed within the mounting recess. The chuck has a longitudinally extending slit and includes a substantially annular reaction member at its distal end. The reaction member has inner and outer reaction surfaces. The outer reaction surface is tapered towards the distal side and a centerline of the mounting recess while the inner reaction surface is tapered towards the proximal side and centerline of the mounting recess. The innermost periphery of the reaction member defines a substantially annular claw having a diameter that is slightly less than the outer diameter of the flexible tube.

A sealing ring is disposed within the mounting recess at a generally proximal position relative to the annular chuck. A release ring is inserted into the mounting recess at a generally distal position relative to the annular chuck. The release ring has a contact surface for engaging the inner reaction surface of the chuck. Additionally, an action surface is provided along the periphery of the mounting recess for engaging the outer reaction surface of the chuck to limit its expansion.

In various preferred embodiments the geometry of the annular chuck may be varied. For example, the annular chuck may include a substantially cylindrical portion located proximally of the reaction member. The reaction member may also be divided into a plurality of radially arranged claw like teeth. In alternative preferred embodiment, the inner and outer reaction surfaces of the various teeth may meet to form either V-shaped or rounded cross sections.

When the flexible tube 7 is inserted into the annular chuck 6, the diameter of the annular chuck 6 is slightly enlarged, and then the claws 603 bite the outer peripheral surface of the flexible tube 7 only with the elastic restoring force of the annular chuck 6. Accordingly, the tip of the flexible tube 7 is easily brought to the innermost end of the mounting recess 2 without fail.

When compressed fluid is supplied after the flexible tube 7 is inserted to the inner end of the mounting recess 2, the flexible tube 7 moves in the pulling-out direction and the annular chuck 6 coupled to the flexible tube 7 moves together with the flexible tube 7. This accompanying movement brings the reaction surface 601 into contact with the action surface 301. Due to this contact, the diameter of the tip side of the annular chuck 6 contracts. Therefore, the claws 603 clamp the outer peripheral surface of the flexible tube 7 and prevent the flexible tube 7 from accidentally falling off. When the release ring 4 in pressed into the mounting recess 2, the tip of the release ring 4 comes into contact with the reaction surface 602 and enlarges the diameter of the annular chuck 6. Thus, the engagement of the claws 603 with the flexible tube 7 is released.

Moreover, in this invention, a cylindrical portion 605 is provided at a proximal side of the annular chuck 6. If the claws 603 of the annular chuck 6 evenly clamp the peripheral surface of the flexible tube 7, the effect for preventing the accidental falling-off of the flexible tube 7 improves to a large extent. However, if the annular chuck 6 is slanted when it clamps the flexible tube 7, an even mating can not be achieved. Such uneven matings are likely to occur when the annular chuck 6 is housed in the mounting recess 2 in a loose engagement condition. However, the uneven mating can be prevented by fitting the cylindrical portion 605 about the outer periphery of the sealing ring 5.

If the slit 604 extends from the tip all the way to the proximal end, when the flexible tube 7 is inserted into the annular chuck 6, the diameter of the proximal side of the annular chuck 6 tends to expand more than that of the tip side. Such diverging expansion prevents a good positioning between the reaction surface 601 and the action surface 301, so that the diameter of the claws 605 does not desirably contract. However, the cylindrical portion 605 is formed relatively long in order to prevent such diverging expansion.

BRIEF DESCRIPTION OF DRAWINGS

FIGS. 1 to 5 show a first embodiment of this invention, FIG. 1 is a vertical sectional view showing a mounting recess before a flexible tube is inserted thereinto.

FIG. 2 is an exploded perspective view.

FIG. 3 is a vertical sectional view showing the mounting recess having the flexible tube inserted therein.

FIG. 4 is a vertical sectional view showing a condition in which compressed fluid is supplied.

FIG. 5 is a vertical sectional view showing a condition in which an annular chuck is released from the tube.

FIG. 9 is a vertical sectional view showing the mounting recess before the flexible tube is inserted thereinto.

FIG. 10 is an exploded perspective view.

FIG. 11 is a vertical sectional view showing the mounting recess having the flexible tube inserted therein.

FIG. 12 is a vertical sectional view showing a condition in which compressed fluid is supplied.

FIG. 13 is a vertical sectional view showing a condition in which the annular chuck is released from the mating condition.

DETAILED DESCRIPTION OF THE DRAWINGS

Figure 2:
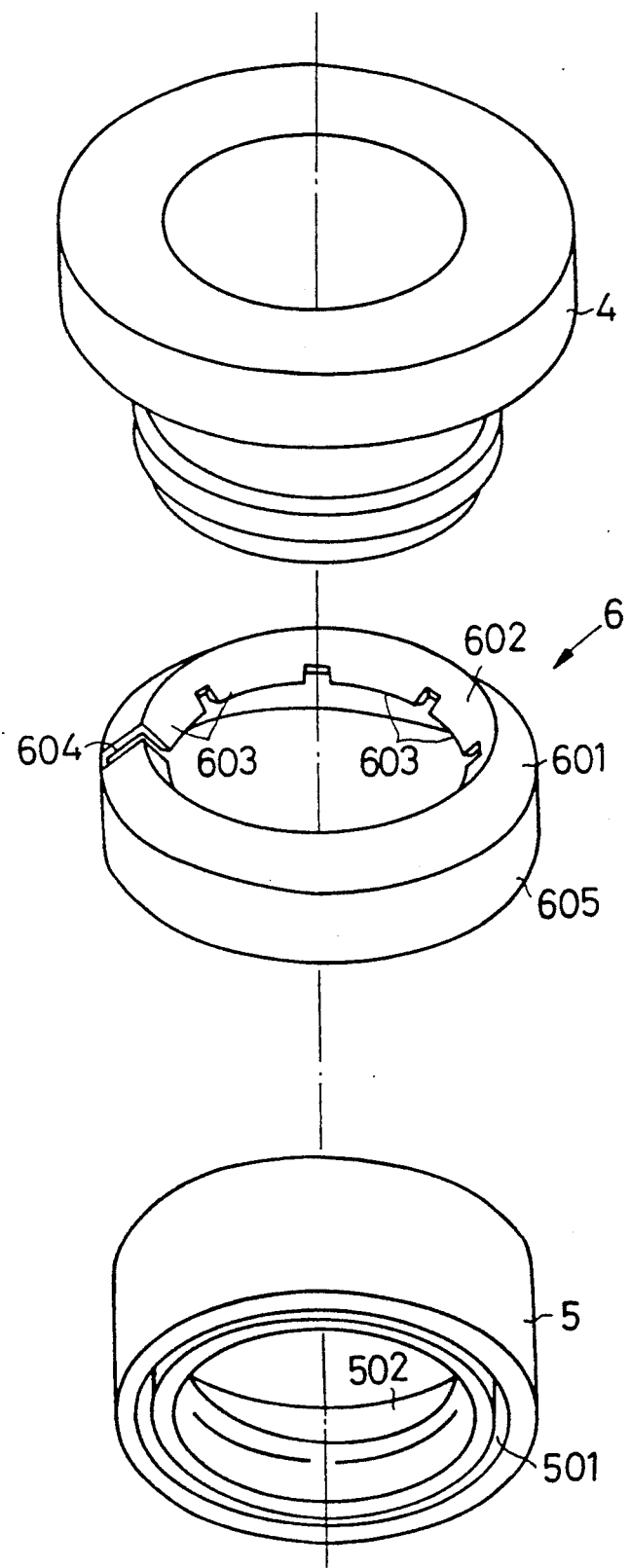

The first embodiment of the present invention is now described referring to FIGS. 1 to 5.

A cylindrical coupler main body shown in FIG. 1 is screwed into the connection port of a cylinder, a valve or the like. A mounting recess 2 is provided at an entrance side of the coupler main body 1, and a guide ring 3 is unslidably fitted to an internal periphery of an opening of the mounting recess 2. A tapered action surface 3a is defined at an inner end of the guide ring 3. A release ring 4 is undetachably inserted into the guide ring 3. The internal diameter of the release ring 4 is slightly larger than an external diameter of a flexible tube 7.

The mounting recess 2 is divided into a small diameter portion 202, a medium diameter portion 203 and a large diameter portion 204 between its inner end and the mounting position of the guide ring 3. A sealing ring 5 is fitted in the medium diameter portion 203, and an elastic annular chuck 6 is fitted in the large diameter portion 204. The diameter of the small diameter portion 202 is slightly larger than the external diameter of the flexible tube 7. An annular groove 501 is defined at a proximal end of the sealing ring 5, and a taper 502 is formed at a tip of the sealing ring 5. The internal diameter of the sealing ring 5 is smaller than the external diameter of the flexible tube 7.

A tip side of the annular chuck 6 first tapers toward the entrance side of the mounting recess 2 and the central axis 11. It then bends toward an inner side. Upper surfaces of this bent portion serve as annular reaction surfaces including an ascending reaction surface 601 and a descending reaction surface 602. As shown in FIG. 2, a plurality of claws 603 are formed at the tip of the annular chuck 6 and are arranged in the peripheral direction about the reaction surface 602. A slit 604 is formed on the annular chuck 6 and extends from the proximal end to the tip of the annular chuck 6 along the axis 11.

As shown in FIG. 1, a cylindrical portion 605 defined at the proximal side of the annular chuck 6 is in a slight contact with an external peripheral surface of the sealing ring 5 in a free condition when the flexible tube 7 is not yet inserted into the mounting recess 2. The diameter of the circle made by tips of the claws 603 is slightly smaller than the external diameter of the flexible tube 7 in the free condition shown in FIG. 1.

Figure 3:
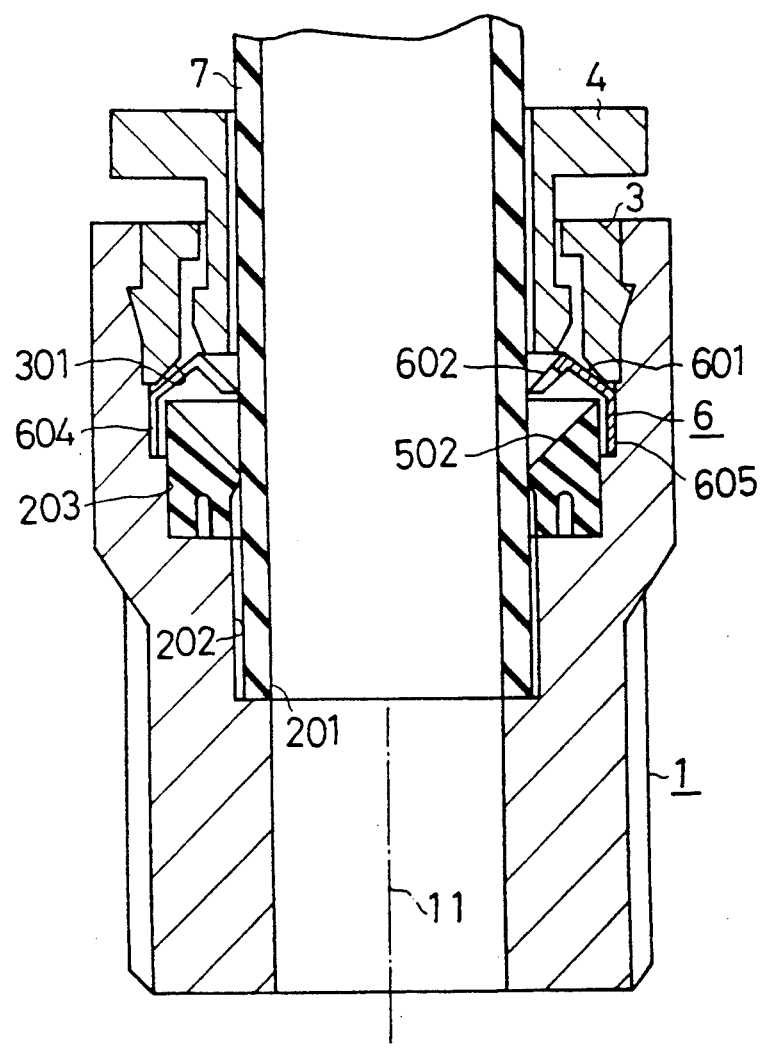

When the flexible tube 7 is inserted and pressed into the release ring 4, the tip of the flexible tube 7 contacts the descending reaction surface 602. The pressing force of the flexible tube 7 opens and enlarges the annular chuck 6. As shown in FIG. 3, the tip portion of the flexible tube 7 is fitted into the small diameter portion 202, and the tip of the flexible portion 7 contacts the inner end 201. In this condition, the claws 603 of the opened and enlarged annular chuck 6 bite the external peripheral surface of the flexible tube 7 with the elastic deformation effect of the annular chuck 6. In a condition shown in FIG. 3, the clamping force of the claws 603 to the flexible tube 7 is only from the elastic deformation effect of the annular chuck 6. If the diameter of the circle made by the tip edges of the claws 603 and the elasticity of the annular chuck 6 are appropriately set, the foregoing clamping force can also be appropriately set such that the clamping force does not become excessive. It is easy to set the clamping force. When the clamping force is set appropriately, the insertion of the flexible tube 7 into the coupler main body 1 is smoothly done, and the tip of the flexible tube 7 can reach the inner end 201 without fail.

As the tip of the flexible tube 7 reaches the inner end 201, the sealing ring 5 is fitted about the flexible tube 7. At this time, the taper 502 permits the flexible tube 7 to be smoothly inserted into the sealing ring 5. In addition, the compressed fluid pressure can be received within the groove 501 so that the seal 5 can provide a good seal between the flexible tube 7 and the mounting recess 2.

Figure 4:
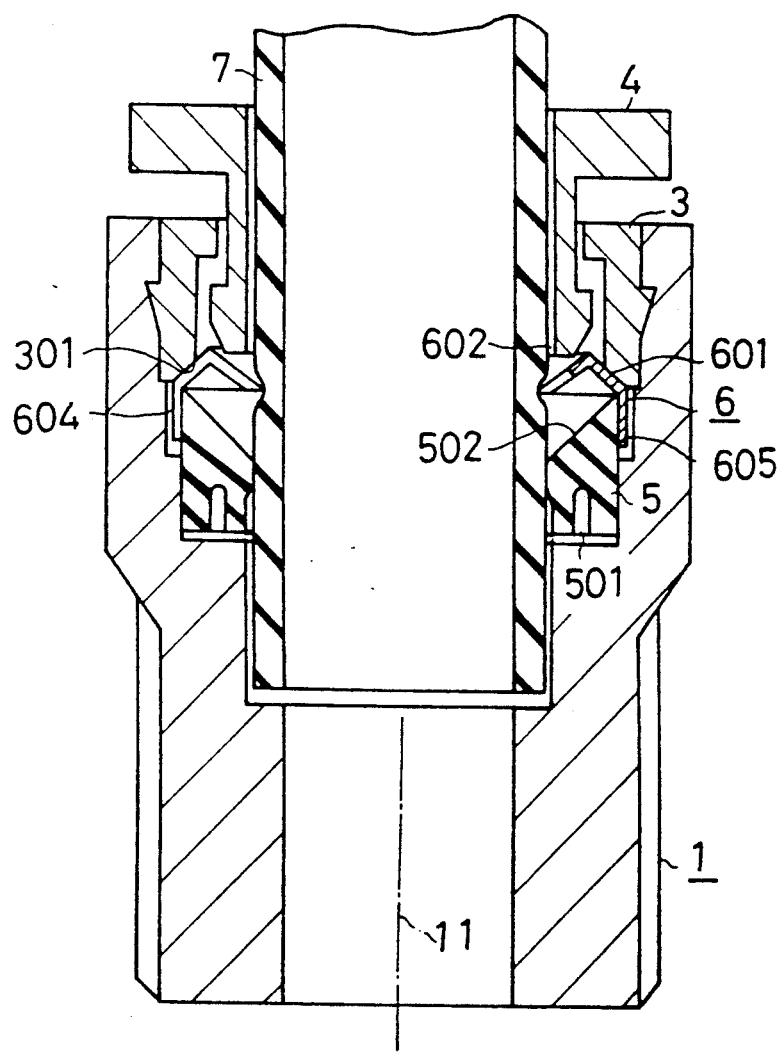

In the condition shown in FIG. 3, when compressed fluid is supplied, the sealing ring 5 and the flexible tube 7 are moved in the pulling-out direction due to the pressure and are detached from the inner end 201. Then, as shown in FIG. 4, the annular chuck 6 clamping the flexible tube 7 also move together with the flexible tube 7. This accompanying movement brings the annular chuck 6 into contact with the action surface 301 by way of the ascending reaction surface 601. This contact makes the diameter of the annular chuck 6 smaller.

As the diameter of the annular chuck 6 becomes smaller, the claws 603 bite the external peripheral surface more, but the clamping stops where both edges of the slit 604 are in contact with each other. That is, the clamping stops when the slit 604 is closed. Accordingly, when the width of the slit 604 in the free condition shown in FIG. 1 is appropriately set, excessive clamping by the claws 603 against the flexible tube 7 can be avoided. Therefore, the damage to the flexible tube 7 due to the excessive clamping can be prevented. At the same time, the flexible tube 7 is preventing from slipping out of the mounting recess 2.

The contraction of the diameter of the annular chuck 6, which brings about the clamping of the claws 603 against the flexible tube 7, is from the direct contact between the annular chuck 6 and the guide ring 3. Thus, even when the diameter of the flexible tube 7 is small, a sufficient clamping force can be applied from the claws 603 to the fexible tube 7.

If the descending annular reaction surface 602 is biased in the radial direction relative to the peripheral edge of the tip of the flexible tube 7, that is, the axis of the annular chuck 6 is not aligned with the axis 11 of the mounting recess 2, then, when the flexible tube 7 is inserted, the peripheral edge of the tip of the flexible tube 7 partially contacts the reaction surface 602. Such partial contact causes the annular chuck 6 to slant relative to the axis 11. If the annular chuck 6 slants, only a part of the claws 603 bite the flexible tube 7. In such an uneven mating condition, if the compressed fluid is supplied, the action surface 301 and the reaction surface 601 come into partial contact with each other, so that the even diameter reduction will not occur over the entire periphery of the reaction surface 601. In this condition, the clamping force of the claws 603 to the flexible tube 7 is low. However, in the free condition shown in FIG. 1 where the flexible tube 7 is not yet inserted, the cylindrical portion 605 is fitted to the external peripheral surface of the sealing ring 5, so that the axis of the annular chuck 6 is aligned with the axis 11 of the mounting recess 2. Accordingly, the reaction surface 602 for enlarging the diameter contacts the entire peripheral edge of the tip of the flexible tube 7, and the annular chuck 6 does not slant relative to the axis 11. Thus, the annular chuck 6 is evenly opened and enlarged about the axis 11. Therefore, if the compressed fluid is supplied, the action surface 301 and the reaction surface 601 do not partially contact each other, and an even contraction of the diameter of the annular chuck 6 can be achieved over the whole periphery. Thus, the claws 603 bite the flexible tube 7 evenly.

When the flexible tube 7 is inserted, the reaction surface 602 for enlarging the diameter is given a pressing down effect, so that the proximal side of the annular chuck 6 tends to be opened and enlarged more than the distal side thereof. If the proximal side of the annular chuck 6 is enlarged more than the distal side thereof, the angle of the ascending reaction surface 601 becomes small, so that the contracting operation, which the reaction surface receives from the action surface 301, is not effectively performed. That is, only a weak clamping force of the claws 603 is applied to the flexible tube 7. However, the relatively long cylindrical portion 605 at the proximal side of the annular chuck 6 prevents this diverging enlargement. Accordingly, a good diameter contracting operation can be achieved between the reaction surface 601 and the action surface 301, so that the clamping force of the claws 603 to the flexible tube 7 will not become weak.

As described above, the claws 603 evenly and strongly bite the flexible tube 7, and the flexible tube 7 can be held by the annular chuck 6 without fail.

Figure 5:
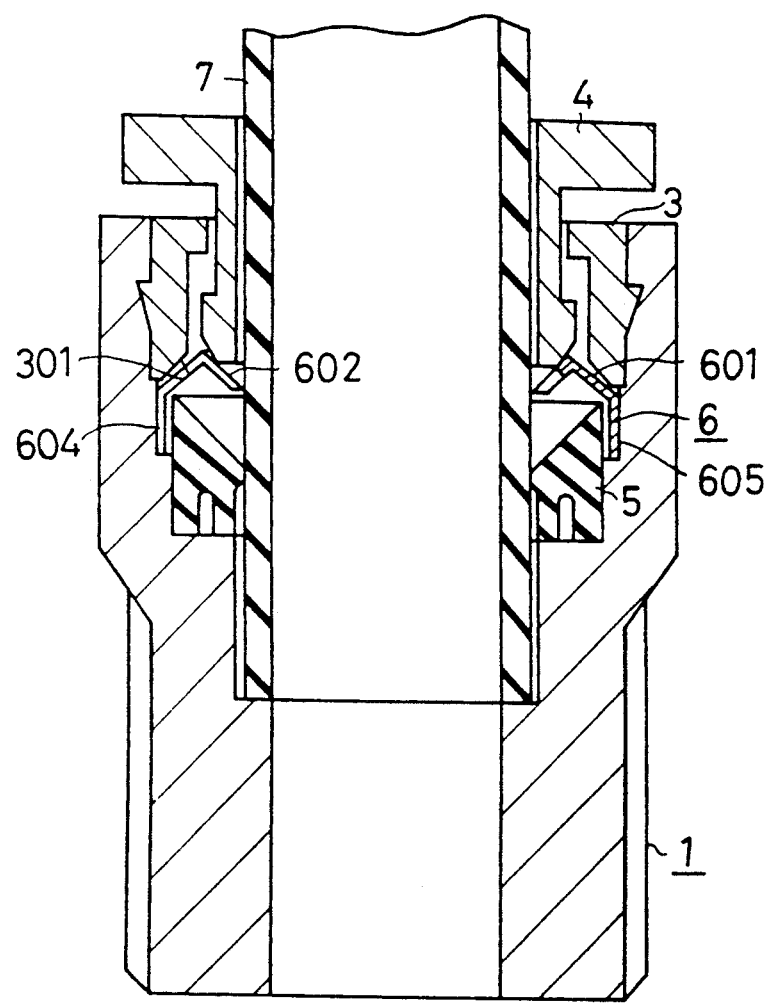

As shown in FIG. 5, when the release ring 4 is pressed into the mounting recess 2, the tip of the release ring 4 comes to contact with the descending reaction surface 602. Accordingly, the pressing force of the release ring 4 is applied to the reaction surface 602 and serves as a force for pressing down the annular chuck 6 toward the inner side of the mounting recess 2 and for enlarging the diameter of the annular chuck 6. Because of this pressing, the ascending reaction surface 601 is detached from the action surface 301, and the annular chuck 6 is smoothly opened and enlarged. Therefore, the mating of the claws 603 against the flexible tube 7 is released, so that the flexible tube 7 can be pulled out from the coupler main body 1.

Figure 6:
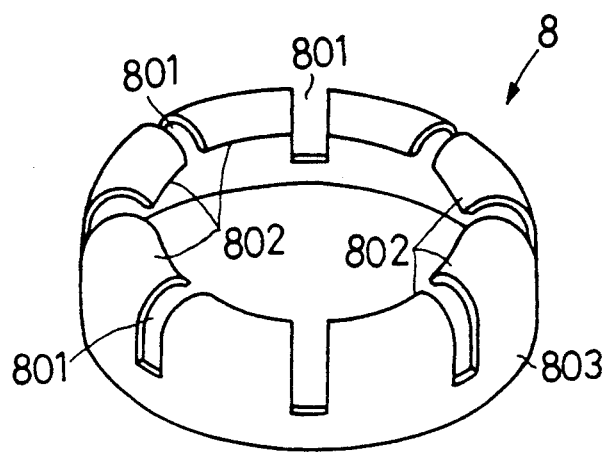
FIG. 6 is a perspective view showing a modification of the annular chuck.

FIG. 6 shows another example of the annular chuck. In this annular chuck 8, the tip side thereof is curved and is turned back. A plurality of slits 801 formed at the annular chuck 8 each have a length extending from the tip of the annular chuck 8 to adjacent the proximal end of a cylindrical portion 803. Similarly, the claws 802 each have a length extending from the tip to adjacent the proximal end. Since the claws 802 are long, the clamping effect that is achieved in the annular chuck 6 of the first embodiment can also be achieved by the displacement of the claws 802 in the radial direction of the annular chuck 8. That is, the slits 801 perform the same operation as the slit 604 in the first embodiment. In addition, the curved portion of the tip side of the annular chuck 8 performs the same operation as the reaction surfaces 601 and 602 in the first embodiment.

Figure 7:
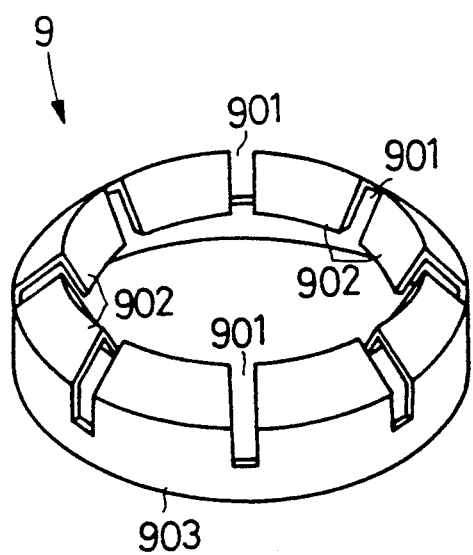
FIG. 7 is a perspective view showing a second modification of the annular chuck.

Claws 902 of an annular chuck 9 shown in FIG. 7 are identical with the claws 603 in the first embodiment, and each of the slits 901 of the annular chuck 9 is identical with the slit 801 shown in FIG. 6.

The disadvantageous diverging enlargement of the proximal side of the annular chucks 8 and 9 will not occur because of the shape of the slits 801 and 901. In addition, if the annular chuck 8 or 9 is fitted to the sealing ring 5 of the first embodiment, the misalignment of the axis of the annular chuck 8 or 9 relative to the axis of the mounting recess 2 will not occur. Accordingly, the flexible tube 7 can be held by the annular chuck 8 or 9 without fail.

Figure 8:
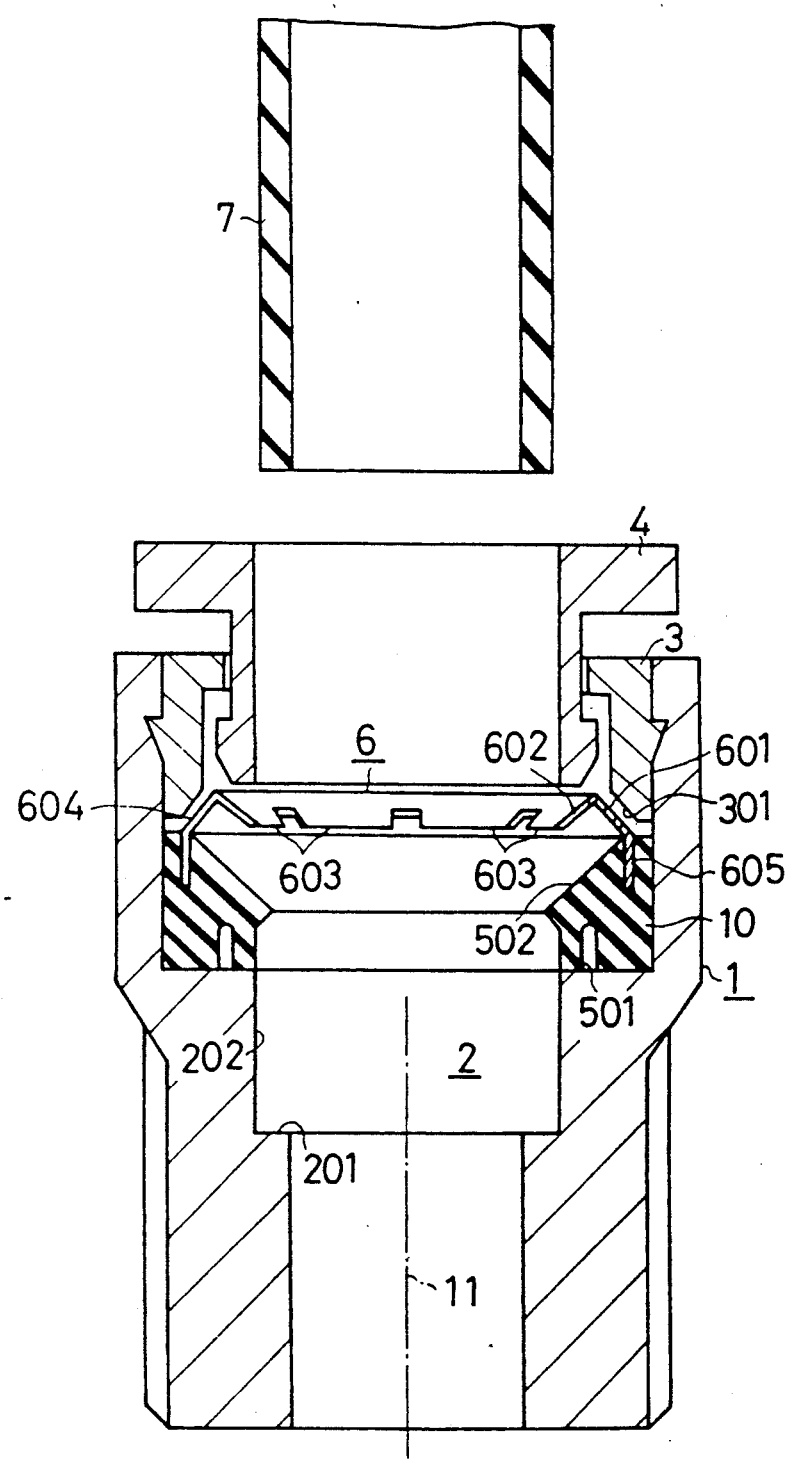
FIG. 8 is a vertical sectional view showing a third embodiment.

FIG. 8 shows another modification of the sealing ring, the cylindrical portion 605 is embedded into a sealing ring 10. Though the slit 604 extends from the tip of the annular chuck 6 all the way to the proximal end thereof, the misalignment of the axis relative to the axis of the mounting recess 2 and the disadvantageous diverging enlargement of the proximal side of the annular chuck 6 will not occur at all because of the holding operation of the sealing ring 10. It goes without saying that the enlargement of the diameter of the tip side of the annular chuck 6 is easily performed. The slight elastic deformation effect of the sealing ring 10 also contributes to this.

An embodiment shown in FIGS. 9 to 13 is most effectively utilized as means for preventing diverging enlargement of the annular chuck.

Figure 9:
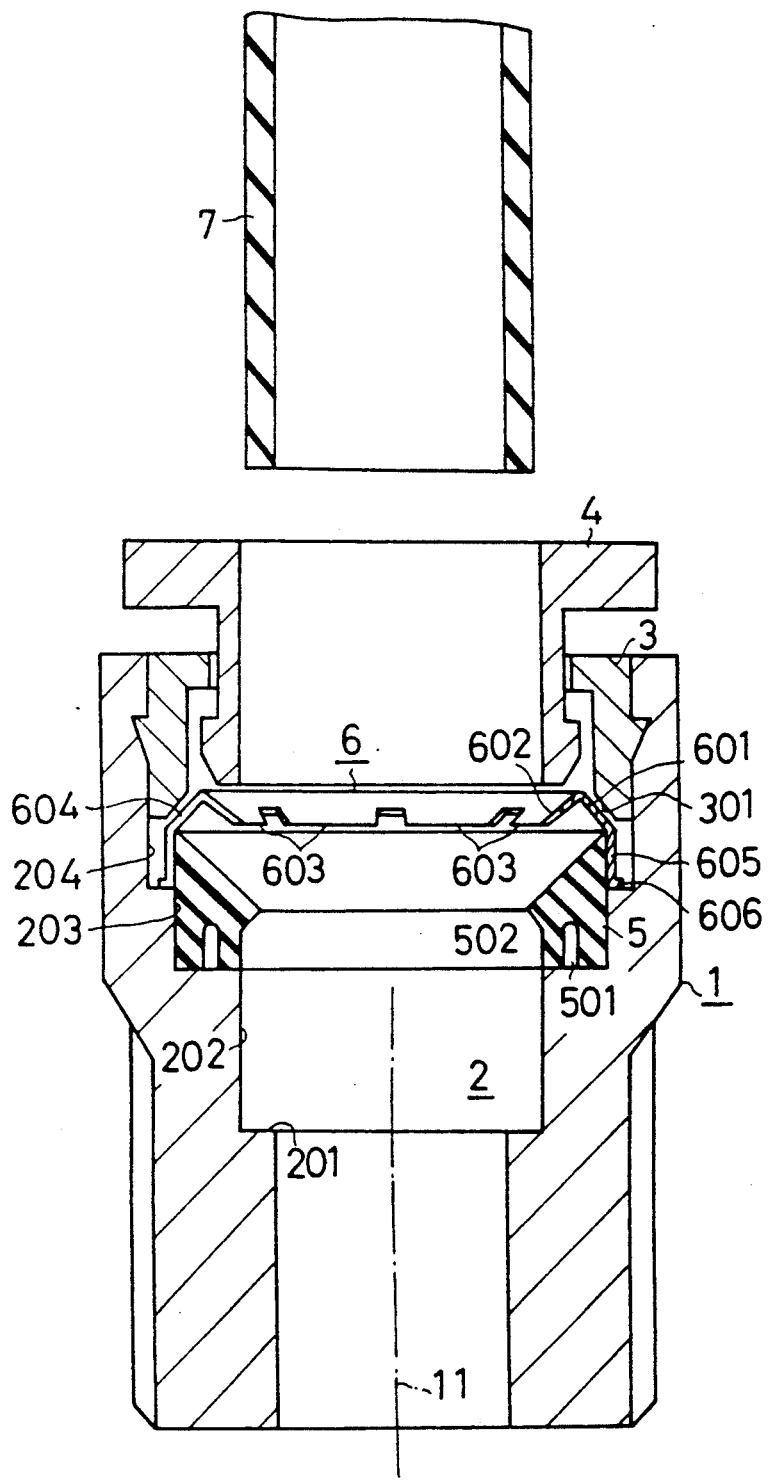
FIGS. 9 to 13 show another embodiment.
Figure 10:
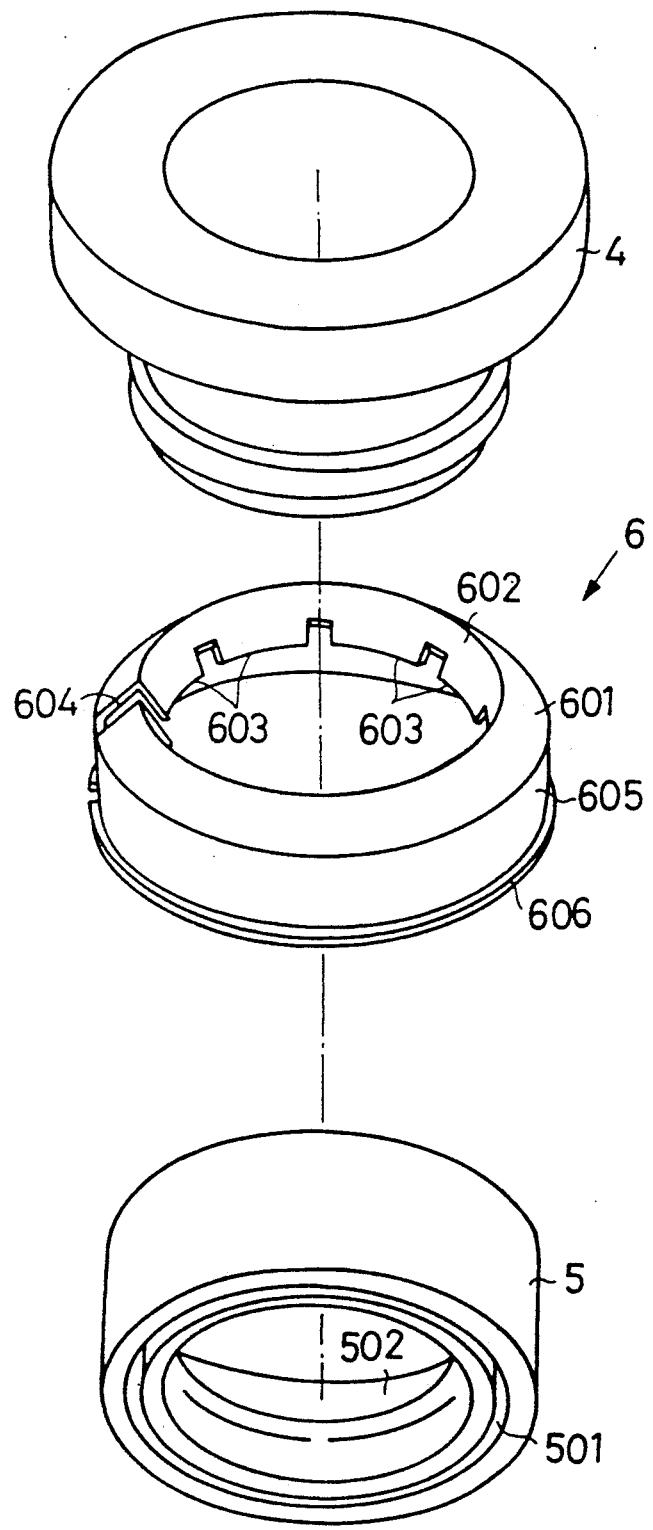
Figure 11:
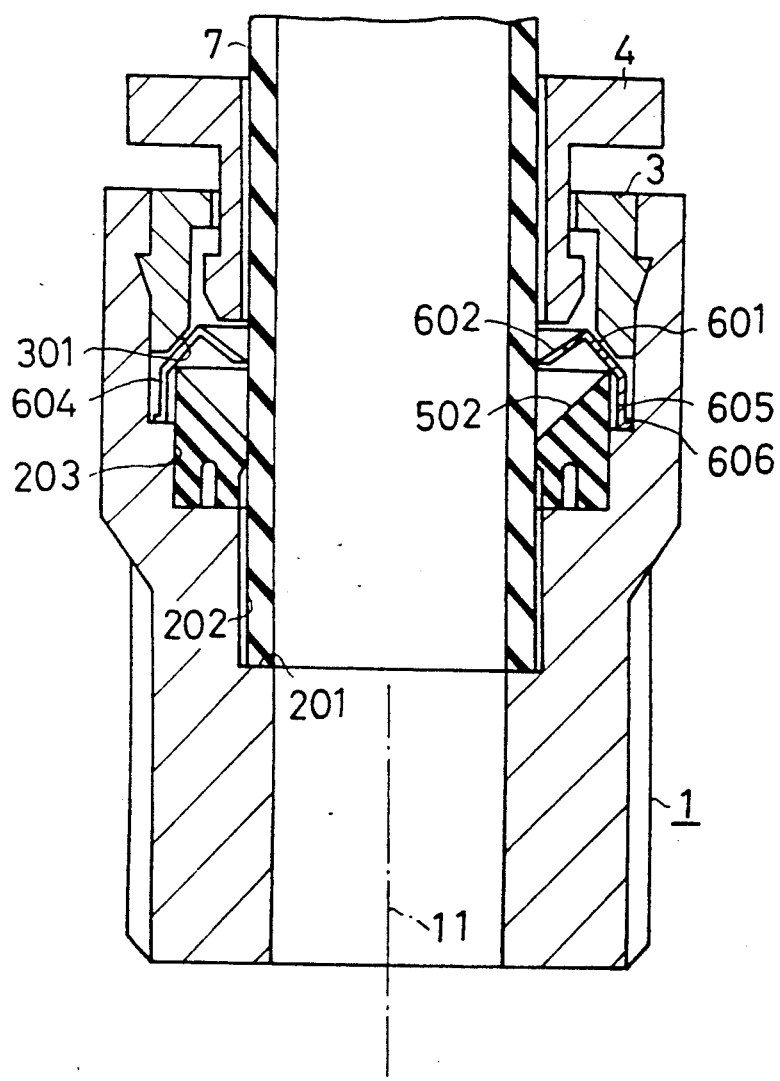
Figure 12:
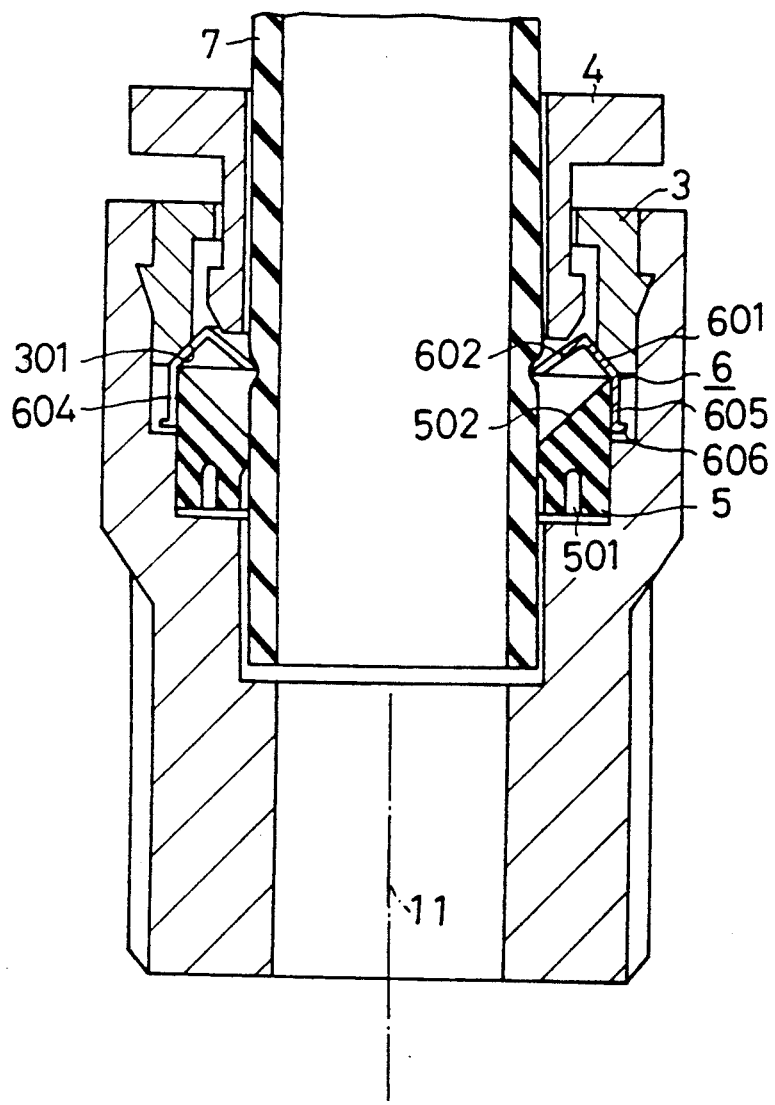
Figure 13:
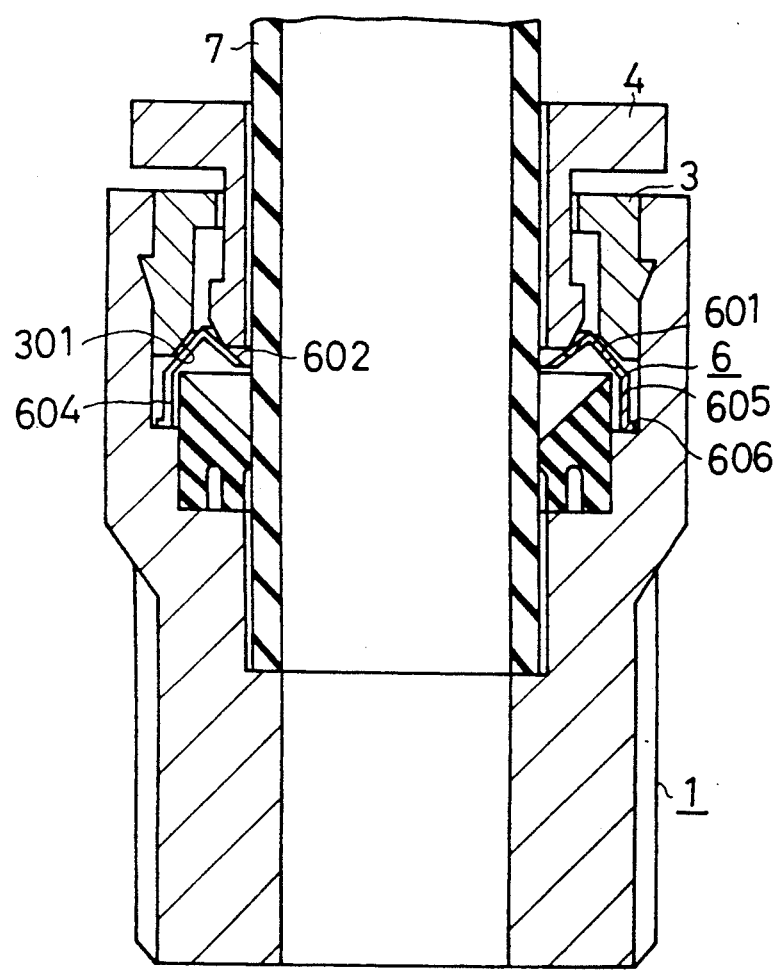

In this embodiment, a flange 606 is provided at the external peripheral edge of the proximal end of the cylindrical portion 605. As shown in FIG. 9, the cylindrical portion 605 is fitted to the sealing ring 5 in the free condition where the flexible tube 7 is not yet inserted just as in the free condition shown in FIG. 1. In this fitted condition, the external diameter of the flange 606 is made equal to or slightly less than the diameter of the large diameter portion 204. Accordingly, as shown in FIG. 11, when the flexible tube 7 is inserted into the mounting recess 2, the diverging enlargement of the annular chuck 6 is prevented because of the contact between the flange 606 and the large diameter portion 204. When the compressed fluid is supplied, the claws 603 bite the flexible tube 7 evenly and sufficiently strongly.

It goes without saying that the engagement of the claws 603 with the flexible tube 7 can be readily released as the release ring 4 is pressed into the mounting recess 2.

In order to prevent the diverging enlargement of the annular chuck, the shape should be limited not only to the flange shape, but also a plurality of protrusions can be formed and arranged on the external peripheral edge of the proximal end of the annular chuck.

In addition, in the present invention, instead of forming a plurality of claws by defining notches at the tip edge of the annular chuck, the tip edge of the annular chuck can be formed as a claw without defining notches thereat, and the claw of such design also can achieve a good chucking effect.

What is claimed is:

1. A pipe coupler for connecting a flexible tube to a fluid line connection port, the pipe coupler having a distal side generally facing the flexible tube and a proximal side, the pipe coupler comprising:

a main body having a mounting recess for receiving the flexible tube that opens at a distal side of the main body, the mounting recess having a longitudinally extending centerline;

a sealing ring disposed within the mounting recess;

a substantially annular split ring chuck disposed within the mounting recess, the split in the chuck forming a longitudinally extending slit that extends the entire length of the chuck, the chuck further including a substantially annular reaction member at the distal end of the chuck, the reaction member having inner and outer reaction surfaces, the outer reaction surface being tapered towards the distal side and the centerline of the mounting recess and the inner reaction surface being tapered toward the proximal side and the centerline of the mounting recess, the innermost periphery of the reaction member defining a substantially annular claw having a free diameter that is slightly less than an outer diameter of the flexible tube, the annular claw being engageable with the tube to expand the slit in the chuck when the tube is inserted into the mounting recess;

a substantially cylindrical portion at the proximal end of the chuck, the cylindrical portion being arranged to receive the distal end of the sealing ring such that the reaction member is positioned adjacent to and surrounds at least a portion of the sealing ring; and a release ring inserted into the mounting recess at a generally distal position relative to the annular chuck, the release ring having a contact surface engageable with the inner reaction surface of the split ring chuck to release the tube from the chuck when the release ring is pressed toward the chuck.

2. A pipe coupler as set forth in claim 1 wherein said chuck further includes a flange that protrudes radially outward from a proximal end of the cylindrical portion.

3. A pipe coupler as set forth in claim 1 wherein the cylindrical portion of the chuck is embedded in the sealing ring.

4. A pipe coupler as set forth in claim 1 wherein the reaction member is divided into a plurality of radially arranged claw like teeth.

5. A pipe coupler as set forth in claim 1 wherein the reaction member is divided into a plurality of radially arranged claw like teeth that are formed integrally with the cylindrical portion, the claw teeth being defined by a plurality of circumferentially spaced longitudinally extending slots.

6. A pipe coupler as set forth in claim 5 wherein the slots extend radially through the entire reaction member and into the cylindrical portion.

7. A pipe coupler as set forth in claim 5 wherein the inner and outer reaction surfaces meet to form a V-shaped cross section.

8. A pipe coupler as set forth in claim 5 wherein the reaction member is rounded to form a smooth transition between the inner and outer reaction surfaces.

9. A pipe coupler as recited in claim 1, wherein the longitudinally extending slit in the chuck has a width sized such that the minimum diameter of the chuck is sufficient to prevent excessive clamping of the tube to avoid damaging the tube during clamping.

* * * * *